March 17, 1931.  C. E. JOHNSON  1,796,791
PISTON RING EXPANDER
Filed Feb. 24, 1930
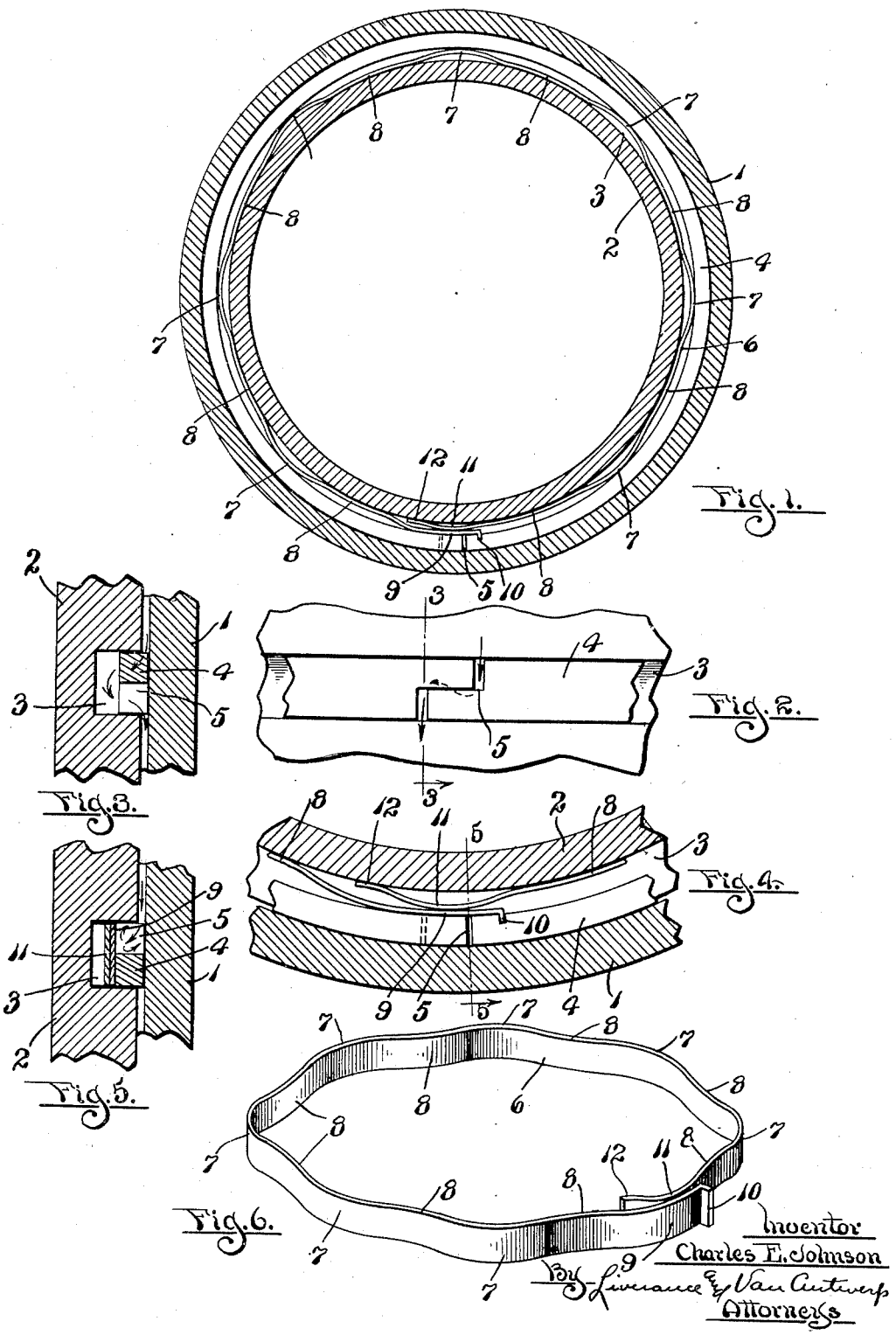
Inventor
Charles E. Johnson Patented Mar. 17, 1931

1,796,791

UNITED STATES PATENT OFFICE

CHARLES E. JOHNSON, OF MUSKEGON HEIGHTS, MICHIGAN

PISTON-RING EXPANDER

Application filed February 24, 1930. Serial No. 430,550.

This invention relates to piston rings and is particularly concerned with a combined expander for piston rings and closure for the gap or parting in the piston ring, whereby the ring is held outwardly so as to engage against the walls of the cylinder, and hence acts to prevent the passage of exhaust gases from the combustion chamber of an engine past the rings at the partings thereof down into the crankcase.

It is a primary object and purpose of the present invention to provide such a combined ring expander and parting closure whereby the results stated may be secured. Other objects and purposes will be apparent upon an understanding of the invention from the following description, taken in connection with the accompanying drawing, in which, Fig. 1 is a cross section through a piston and cylinder showing a piston ring therein and the combined ring expander and parting closure of my invention in association therewith.

Fig. 2 is a fragmentary enlarged elevation illustrating a portion of a piston and piston ring, that portion of the piston ring at the gap or parting being disclosed and indicating how exhaust gases may pass by a ring at said parting.

Fig. 3 is a fragmentary vertical section on the plane of line 3—3 of Fig. 2.

Fig. 4 is a fragmentary enlarged horizontal section, similar to that shown in Fig. 1, showing the manner in which the ring expander acts as a parting or gap closure.

Fig. 5 is a fragmentary vertical section on the plane of line 5—5 of Fig. 4, and Fig. 6 is a perspective view of the ring expander and gap closure element which is used between the inner curved side of a ring and the bottom of a piston ring groove.

Like reference characters refer to like parts in the different figures of the drawing.

In internal combustion engines within a cylinder, as 1, a piston 2 is mounted for reciprocation, the piston normally having a plurality of ring grooves, such as 3, therein, in which piston rings 4 are placed. The rings are parted at one side and have a normal tendency to spring outward and separate at the parting. When they are installed around a piston within a cylinder, the rings are contracted or squeezed together so as to bring their ends at the partings relatively close together. There are various types of partings or gaps used in piston rings, such as diagonal slot cut and the like, but one of very prevalent use is the lap joint type of parting, indicated at 5, best shown in Fig. 2. This parting, however, is not proof against the passage of gases; for the gases coming to one end of the parting as indicated by the arrow in Fig. 2, pass through the gap inward to the piston ring groove and thence out through the gap at the other end as indicated by the arrow course shown in Figs. 2 and 3.

Through usage the rings and cylinder walls wear and cause objectional leakage through said partings 5 and in time the rings become useless. My invention seals the passage at parting 5 and stops leakage through excessive opening caused by wear on rings and cylinder walls, and the rings give satisfactory results for a much longer period, the passage being sealed by my invention.

In my invention, a member 6 of flat spring material is used, designed to be located in a piston ring groove at the bottom thereof and bear against the inner curved side of a ring seated in said groove. This member 6 is formed with outward convex raises or humps 7 connected by oppositely bent concave sections 8. Where the two ends of the member 6 come together one end portion is brought inside of the other and the outer portion, at 9, is curved to fit the inner surface of the ring a short distance and terminates in an outwardly turned lip 10. The end portion of the other end of the member 6 directly back of the section 9 is formed with a convex hump 11 which is then continued in a terminal reversely bent short bearing extremity 12.

When an assembly of a piston ring with the member 6 in a ring groove is made and the piston with the ring placed in a cylinder, the convex portions 7 bear against the inner curved side of the ring 4 at spaced apart points, while the intermediate connecting portions 8 bear against the bottom of the ring groove 3 as best shown in Fig. 1. The terminal lip 10 seats in a notch or groove cut vertically in the inner curved side of the ring 4 adjacent the parting or gap 5 in the ring whereby the adjacent section 9 covers the gap or parting completely. The convex section 11 lies inside of and has a strong spring actuated bearing against the inner side of the section 9 so as to hold it at all times tightly against the inner side of the ring it being evident that the bearing of the terminal portion 12 and of the adjacent section 8 at the ends of the section 11 against the bottom of the ring groove causes said section 11 to exert continuous spring pressure against the parting closing section 9.

While the notch or groove which receives the lip 10 is shown located adjacent the ring parting it is to be understood that for the parting closing section 9 and the pressure actuated means such as 11 or its equivalent to be thus located and held, the terminal lip 10 engaging in the notch located closely adjacent to the ring parting, is not necessarily used as several other specifically different arrangements can be designed securing the same end. The present structure while preferred is in no sense the only one that can be used and the invention is not limited to what is here specifically shown and described. For instance, the holding lip 10 engaged in a groove in the ring may have readily substituted therefor a projecting pin carried by the member 6 at any point in its length to engage in a recess or socket therefor at a proper position at the inner side of the ring so as to bring the sections 9 and 11 properly into association with each other at the ring parting. It will also be understood that section 7 may be so formed as to close parting 5 and other means than lip 10 used to hold section 7 in place.

The construction described is particularly practical and efficient. To machine the ring for the expander member 6 to engage therewith is a very simple operation while the manfacture of the member 6 is likewise easily accomplished at low cost. The width of the member 6 is uniform throughout and is very slightly less than the distance between the upper and lower sides of a ring groove, or the same as the distance between the upper and lower flat sides of a piston ring. The invention is defined in the appended claims and is to be considered comprehensive of all forms of structure coming within their scope.

I claim:

1. In combination with a piston having a ring groove therein and a piston ring in said groove, said piston ring being parted at one side, of a member located in said groove within the piston ring having ends overlapping, one end portion of said member bearing against the piston ring at its inner side and completely covering said parting therein, and the other end portion of said member being interposed between the first end portion thereof and the bottom of the piston ring groove and exerting pressure to hold the first mentioned end portion of the member in close contact with the piston ring to maintain said parting in covered relation.

2. A construction containing the elements in combination defined in claim 1, combined with interengaging means on said piston ring and on said member for properly locating the ring and said member with respect to each other whereby said first end portion of said member is held in position to cover said parting in the piston ring.

3. In combination a piston having a ring groove therein and a piston ring in said groove, said piston ring having a parting at one side, of a ring expander member located in said groove between the ring and the bottom of the groove, said ring expander member comprising a length of flat material having alternate raises and depressions therein and having overlapping end portions, one end portion bearing against the inner side of said piston ring at the parting to completely cover the same, and the other end portion being located between the first end portion and the bottom of the ring groove and pressing against said first end portion to hold it in direct, close and intimate contact with the inner side of the ring at and over said parting.

4. In combination a piston having a ring groove therein and a piston ring located in said groove, said piston ring having a parting at one side, of means for covering said parting at the inner side of the ring comprising a section of metal lying against the inner side of the ring and completely covering the parting therein, and spring actuated means between said section of metal and the bottom of the ring groove bearing against said section of metal and holding it against the ring and over said parting therein.

5. A piston ring having a parting at one side therein and a ring expander member located within said piston ring comprising, a length of material the width of which is the same substantially as the distance between the parallel flat sides of the ring, said member having ends overlapping at the parting in the ring, one of the end portions of said member lying snugly against the inner side of the ring and covering said parting, and the other end portion lying inside of the first end portion and adapted to exert pressure against said first end portion to hold it in contact with the ring.

6. A construction containing the elements in combination defined in claim 5, combined with interengaging means on said member and piston ring for properly locating the overlapping ends of said member at said parting in the ring.

7. A piston ring having a parting at one side therein and provided with a notch at its inner side adjacent the parting, a ring expanding member located within the piston ring comprising a length of spring metal located around and inside the piston ring and having overlapping ends, one end portion of the member having an outturned lip to seat in the notch in said piston ring, said end portion of the member lying against the inner side of the ring and covering the parting therein, and the other end portion of said member being adapted to exert pressure against the first end portion of said member to hold it against the inner side of the ring.

In testimony whereof I affix my signature.

CHARLES E. JOHNSON.